United States Patent [19]

Freber

[11] Patent Number: 4,682,817
[45] Date of Patent: Jul. 28, 1987

[54] ADJUSTABLE HEAD RESTRAINT FOR VEHICULAR SEATS

[75] Inventor: Elmer C. Freber, St. Louis, Mo.

[73] Assignee: Marquette Tool & Die Company, St. Louis, Mo.

[21] Appl. No.: 694,613

[22] Filed: Jan. 24, 1985

[51] Int. Cl.⁴ .......................... A47C 7/36; B60N 1/00
[52] U.S. Cl. ................................................ 297/408
[58] Field of Search ............... 297/408, 391, 400, 403; 248/412, 414

[56] References Cited

U.S. PATENT DOCUMENTS

| | | | |
|---|---|---|---|
| 3,300,249 | 1/1967 | Schneider | 297/408 |
| 3,680,180 | 8/1972 | Gould et al. | 24/279 |
| 3,692,062 | 9/1972 | Dunmire | 24/279 X |
| 3,737,959 | 6/1973 | Smith et al. | 24/279 |
| 3,825,301 | 7/1974 | Schwarz | 297/408 |
| 4,191,422 | 3/1980 | Inasawa et al. | |
| 4,222,608 | 9/1980 | Maeda | |
| 4,265,482 | 5/1981 | Nishimura et al. | |
| 4,304,439 | 12/1981 | Terada et al. | |

FOREIGN PATENT DOCUMENTS

| | | | |
|---|---|---|---|
| 2037033 | 3/1972 | Fed. Rep. of Germany | 297/408 |
| 2312050 | 9/1974 | Fed. Rep. of Germany | 297/408 |
| 2647725 | 4/1978 | Fed. Rep. of Germany | 297/408 |
| 2856723 | 7/1979 | Fed. Rep. of Germany | 297/408 |
| 2945060 | 5/1981 | Fed. Rep. of Germany | 297/408 |

Primary Examiner—Peter A. Aschenbrenner
Assistant Examiner—Mark W. Binder
Attorney, Agent, or Firm—Gravely, Lieder & Woodruff

[57] ABSTRACT

A head restraint for use on the backrest of a seat for an automotive vehicle has a post that fits into the backrest and a bracket attached firmly to the upper end of the post. The bracket at its ends carries trunnions, each of which is encircled by a split bushing having radially directed lugs that are separated at the split in the bushing. The bushings, which are otherwise generally cylindrical, fit into arcuate seats on end members, and the end members are in turn attached to and rigidify a metal can or core that forms part of a cushion that is located behind the head of the occupant of the seat. The cushion pivots forwardly and rearwardly on the trunnions between a generally upright position, where is serves merely as a head restraint, and a forwardly inclined position, where it may be used as a head rest. Each end member also has a clamp provided with clamping elements which bear against the sides of the lugs for the bushing in that end member. Screws, the heads of which are accessible, draw the clamping elements together and enable the frictional resistance between the bushings and their respective trunnions to be varied.

17 Claims, 9 Drawing Figures

ADJUSTABLE HEAD RESTRAINT FOR VEHICULAR SEATS

BACKGROUND OF THE INVENTION

This invention relates to seating and more particularly to head restraints for the seats of automotive vehicles.

In automobiles of current manufacture, the front seats, as a safety precaution, are equipped with head restraints, which are devices that project upwardly from the backrests of those seats, there usually being one at the driver's seat and another at the passenger's seat. Should the vehicle experience a sudden and unexpected jolt forwardly, as may occur in a rear end collision, the driver's and passenger's heads will jerk rearwardly and come against their respective head restraints, which arrest the movement, thereby preventing a serious injury known as whip lash.

Most head restraints of current design have a cushion and a single mounting post which extends into the backrest of the seat and supports the cushion above the upper edge of the backrest. The post telescopes within the backrest, enabling the elevation of the cushion to be adjusted to accommodate individuals of different height.

However, the cushion of the typical head restraint is normally set too far rearwardly to serve as a head rest, and is therefore of little comfort to the seat occupant on long highway trips. Indeed, the occupant must bend his neck backwardly into a somewhat uncomfortable, but not dangerous, position, to bring it against the cushion of the head restraint, and that position is usually a good deal more uncomfortable than holding one's head upright without support for long periods of time.

On one type of head restraint the cushion tilts forwardly and backwardly, and when forwardly may be used as a head rest. While these head restraints are better than the conventional head restraint, they are somewhat complex and difficult to assemble. Furthermore, most tilting head rests rely on friction to hold the cushion in whatever position to which it is moved, yet do not provide any means for controlling the frictional resistance. Should the friction surfaces wear, the cushion will swing too easily, and while still serving as a head restraint, it will not be very useful as a head rest.

Indeed, one type of adjustable head restraint that is currently used in some more expensive foreign automobiles has a U-shaped post, the legs of which project into the backrest of the seat. The connecting bight portion of the post serves as the mount for the cushion which is attached to it with saddle-type clamps. Thus the cushion pivots on the bight portion of the U-shaped post. However, the arrangement places the pivot axis too low, thereby causing the upper end of the cushion to swing through much too great of an arc. Also, the saddle clamps are exposed, making the head restraint somewhat unattractive.

SUMMARY OF THE INVENTION

One of the principal objects of the present invention is to provide a head restraint that may be adjusted backwardly and forwardly on the backrest of a seat. A further object is to provide a head restraint of the type stated in which the adjustable cushion is held in position intermediate its extreme forward and rear positions by friction within the pivot mechanism of the restraint. Another object is to provide a head restraint of the type stated in which it is possible to easily adjust the frictional resistance within the pivot mechanism. An additional object is to provide a head restraint of the type stated in which the adjustments in the frictional resistance may be made without removing the head restraint from the seat backrest or detaching trim or upholstery from the head restraint. Still another object is to provide a head restraint of the type stated which has a single mounting post. Yet another object is to provide a head restraint of the type stated which is simple in construction and inexpensive to manufacture. These and other objects and advantages will become apparent hereinafter.

DESCRIPTION OF THE DRAWINGS

In the accompanying drawings which form part of the specification and wherein like numerals and letters refer to like parts wherever they occur

DETAILED DESCRIPTION

Figure 7:
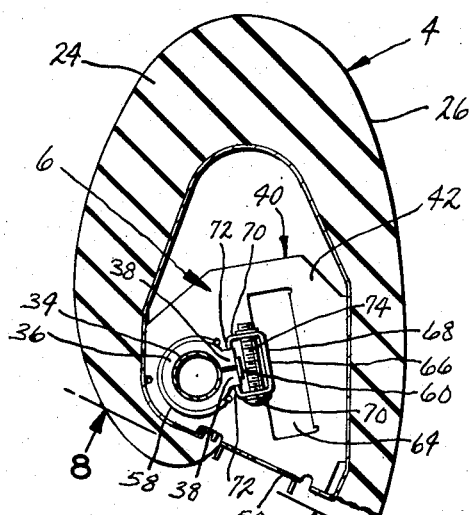
FIG. 7 is a sectional view taken along line 7—7 of FIG. 4 and showing the inside face of one of the brackets and its association bushing, each of which constitute part of the pivot assembly.
Figure 8:
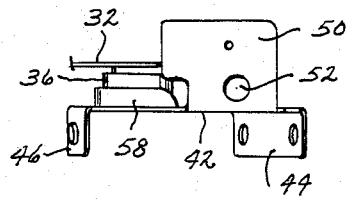
FIG. 8 is a bottom view of one of the pivot assembly end members taken along line 8—8 of FIG. 7.
Figure 5:
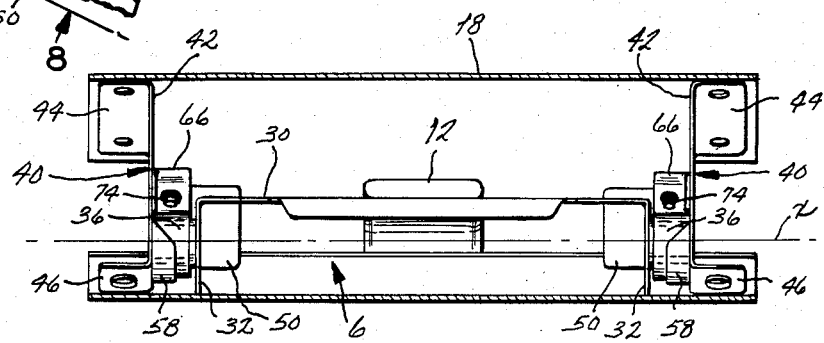
FIG. 5 is a sectional view of the head restraint taken along line 5—5 of FIG. 3 and likewise showing the bracket and end members, of the pivot assembly.
Figure 4:
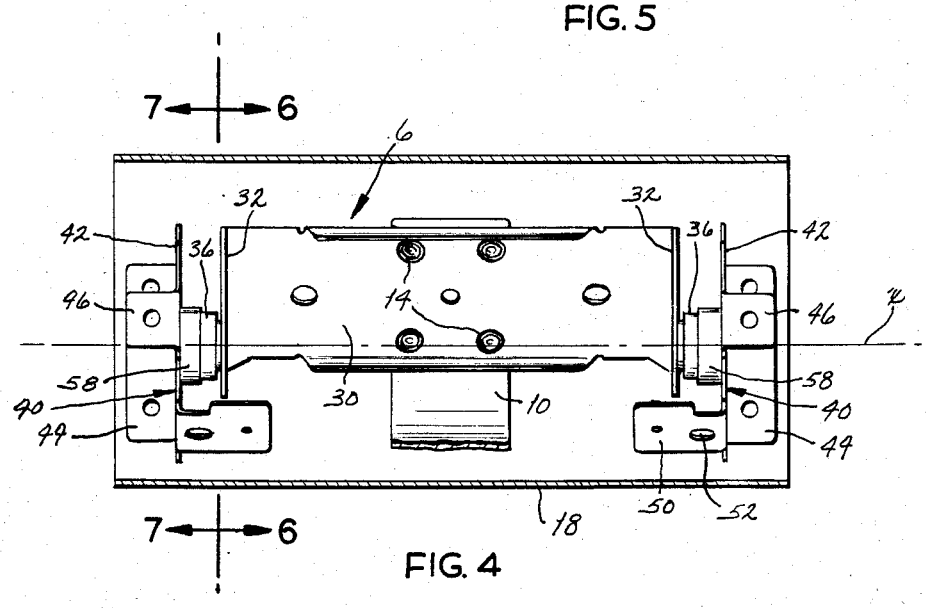
FIG. 4 is a sectional view of the head restraint taken along line 4—4 of FIG. 3 and showing the bracket and end members of the pivot assembly.
Figure 9:
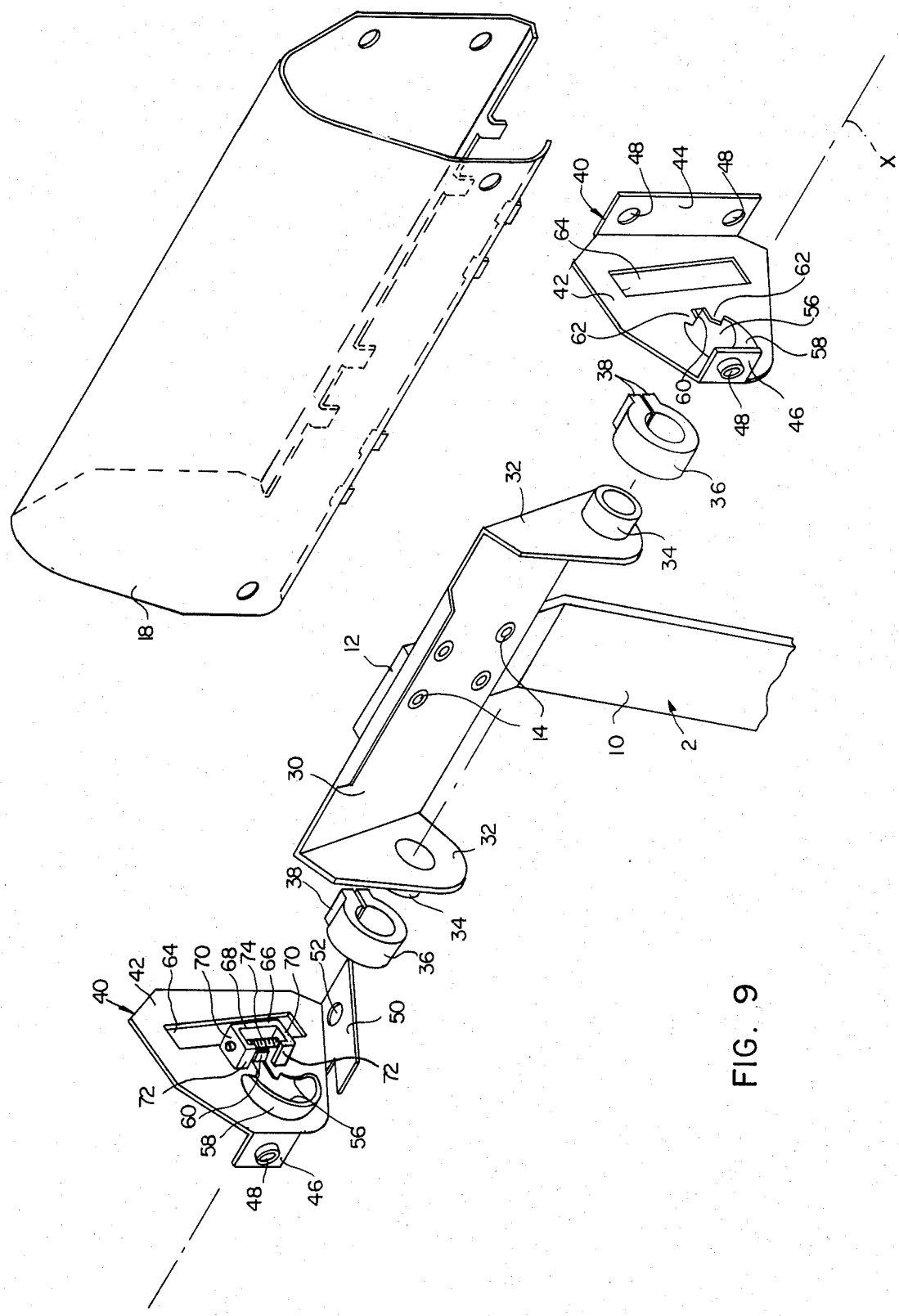
FIG. 9 is an exploded perspective view showing the pivot assembly and also the core of the cushion and the post on which the pivot assembly is mounted.

Referring now to the drawings (FIGS. 1 & 2), a head restraint A projects above the upper surface of a backrest B for the seat of an automotive vehicle, it being positioned such that it will be directly behind the head of the individual who occupies the seat. As such, it will arrest movement of occupant's head should the vehicle experience a sudden and unexpected jolt as could well occur in a rear end collision. The head restraint A is adjustable in two directions, namely upwardly and downwardly and also forwardly and rearwardly. The former adjustment accommodates the head restraint A to seat occupants of different height, while the latter permits the head restraint A to also function as a head rest. The head restraint A includes several basic components, namely a post 2 that projects from the backrest B of an automotive seat, a cushion 4 that extends beyond the post 2 and is supported by the post 2 above the upper surface of the backrest B, and a pivot assembly 6 (FIGS. 2, 7 & 9) through which the cushion 4 is connected to the post 2 such that the cushion 4 can pivot forwardly and rearwardly on the post 2 between a generally upright position and a forwardly inclined position.

The post 2 is preferably a bar having a straight shank 10 (FIG. 6) and a short inclined portion 12 that turns forwardly at the upper end of the shank 10. The shank 10 is substantially longer than the forwardly turned upper portion 12 and fits into a socket that opens out of the upper end of the backrest B. Indeed, the shank 10 telescopes within the socket so that it may be moved upwardly or downwardly to alter the height of the cushion 4. Along its socket the backrest B is provided with a friction device which bears against the shank 10 and holds the post 2 in any position to which it has been moved. The upper portion 12 lies oblique to the shank 10 and has rivets 14 (FIG. 9) projecting from it. Preferably, the post 2 is formed from a somewhat malleable metal, such as aluminum or low carbon steel, so that the rivets 14 may be extruded from the upper portion 12, in which case they are formed integral with the post 2. They serve to locate the pivot assembly 6 on and secure it to the post 2.

The cushion 4 is for the most part hollow, and within its interior it contains the pivot assembly 6 and the short upper portion 12 of the post 2. To this end, the cushion 4 includes (FIGS. 3 & 6) a can or core 18 which is preferably stamped from sheet metal in an arched configuration with the arch being presented upwardly and enclosing the pivot assembly 6. Being arch-shaped, the core 18 has front and rear walls and spaced apart lower margins. Along these margins, the core 18 is provided with cinch tabs which extend through and are bent over the bottom face of a closure board 20 that may be formed from an inexpensive fibrous material. The closure board 20 contains an aperture 22 through which the shank 10 of the post 2 extends and access holes to the side of the aperture 22, but otherwise it generally closes the bottom of the core 18. The pivot assembly 6 attaches to the cushion 4 at the rigid core 18.

In addition to the core 18, the cushion 4 contains (FIGS. 3 & 6) padding 24 which extends over the front, rear and top faces of the core 18 and further across the end of the core 18, thereby closing those otherwise open ends. The padding 24 may be a foamed cellular material having good resilience. Any foamed cushioning material, such as polyurethane, is suitable for the padding 24. The cushion 4 also has an upholstery cover 26 which is made from the same material as the upholstery on the backrest B and completely covers the padding 24. The cover 26 also extends beneath the core 18 where it is secured by staples driven into the fibrous closure board 20. Finally, the cushion 4 has a plastic trim cover 28 which extends over the closure board to obscure the board 20 itself, the margins of the cover 26, the staples for the cover 26, and the cinch tabs of the cor 18. The plastic cover 28 has access holes which align with the access holes in the closure board 20.

Figure 1:
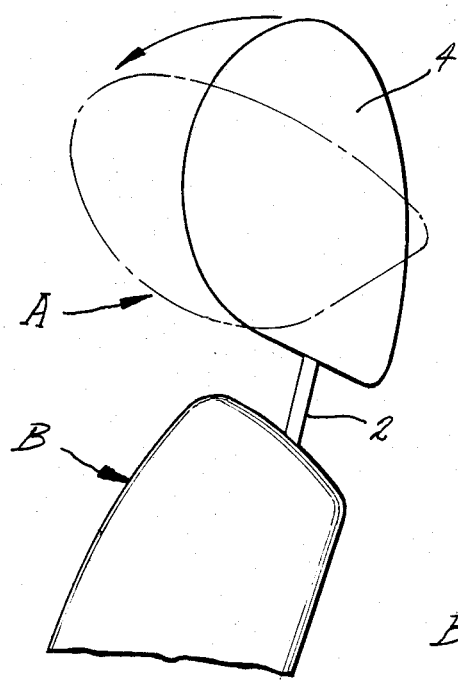
FIG. 1 is a side elevational view of a vehicular seat provided with a head restraint constructed in accordance with and the present invention.
Figure 2:
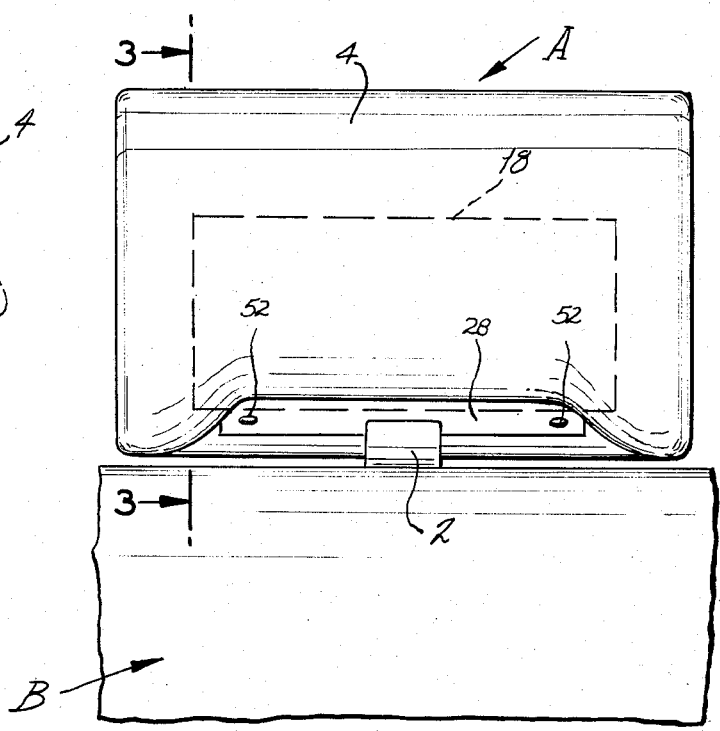
FIG. 2 is a front elevational view of the head restraint.

The pivot assembly 6 attaches the post 2 to the cushion 4, allowing the latter to pivot on the former about a pivot axis x that is located near, but not along the bottom of the cushion 4 (FIGS. 3–9). Indeed, the cushion 4, by reason of the pivot assembly 6, may pivot from a rear or generally upright position to a forward or inclined position (FIG. 1). In the upright position it is set somewhat rearwardly from the normal position assumed by the head of the individual who sits on the seat and leans against the backrest B, but will arrest movement of the head without injury to the neck. In the inclined position the cushion 4 actually functions as a head rest in that the individual may comfortably rest his head against the cushion while driving. While the cushion 4 does not move beyond its upright and inclined positions, it will assume intermediate positions between those two extremes, and when in those intermediate positions is held by the friction within the pivot assembly 6.

Figure 6:
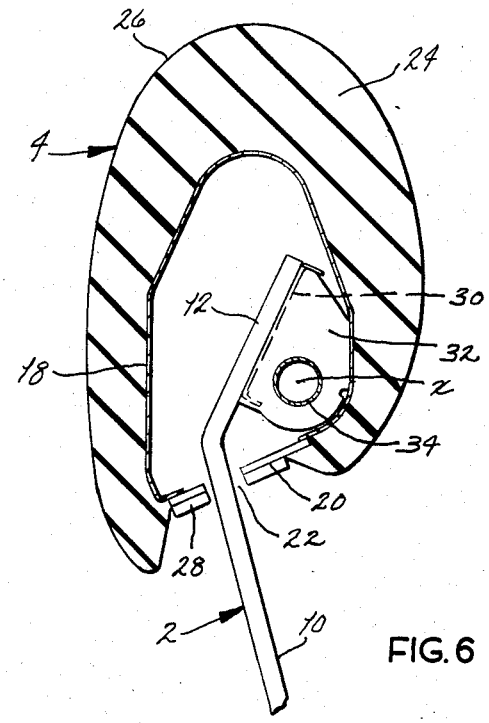
FIG. 6 is a sectional view taken along line 6—6 of FIG. 4 and showing one end of the bracket for the pivot assembly.

The pivot assembly 6 includes (FIG. 9) steel mounting bracket 30 which extends across the forwardly inclined upper portion 12 of the post 2 and projects laterally beyond each side of the upper portion 12. Indeed, the bracket 30 contains apertures through which the extruded rivets 14 on the upper portion 12 pass, and these rivets 14 are upset over the face of the bracket 30 to secure the bracket 30 firmly to the post 2. At each of its ends, the bracket 30 turns downwardly in the form of an end portion 32, and each end portion 32 has a spindle or trunnion 34 extruded outwardly from it. The two trunnions 34 lie along the pivot axis x. Moreover, the forward margins of the bracket 30 conform to the configuration of the front wall of the core 18, and indeed lie along that wall when the cushion 4 is in its rear or upright position (FIG. 6).

Around each trunnion 34 is a split bushing 36 (FIGS. 7 & 9) which is for the most part cylindrical in that it has cylindrical inner and outer surfaces which are concentric. However, the bushing 36 also has two lugs 38 which project generally radially from the cylindrical outer surface and are spaced apart slightly, with the space between them forming the split in the bushing 36. The inner surface of the bushing 36 conforms to the cylindrical surface of the trunnion 34 around which the bushing 36 fits, while the lugs 38 provide bearing surfaces against which a clamping force may be applied to the bushing 36. By varying this clamping force, the frictional resistance of the bushing 36 to rotation on its trunnion 34 may be altered. The two bushings 36 are identical, and are preferably molded from a durable low friction material such as nylon.

Figure 3:
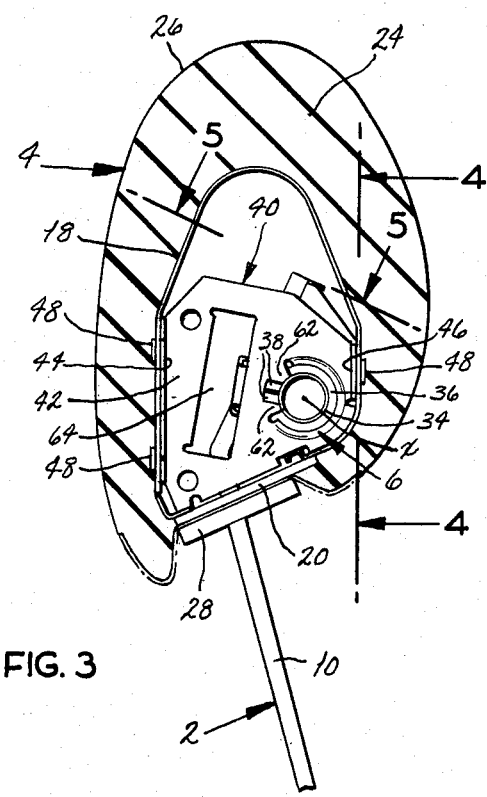
FIG. 3 is a sectional view of the head restraint taken along line 3—3 of FIG. 2 and showing one of the end members for the pivot assembly of the head restraint.

In addition to the bracket 30 and the two lugs 38, the pivot assembly 6 also includes two end members 40 (FIGS. 7 & 9) to which the bushings 36 are fitted, there being one member 40 for each bushing 36. The end members 40, like the rest of the pivot assembly 6, fit into and are contained wholly within the core 18 of the cushion 4. Indeed, the end members 40 span the front and rear walls of the core 18 at each end of the core 18 and are firmly secured to those walls so as to rigidify the core 18 (FIG. 3).

Each end member 40 is an integral sheet steel unit derived from a rather complex stamping operation. Since one end member 40 is merely the reverse of the other, only one will be described. That end member 40 includes (FIGS. 3, 7 & 9) a cross wall 42 that extends across the interior of the core 18 from the rear wall to the front wall thereof. Along its rear margin the cross wall 42 merges into a connecting tab 44 which lies along the rear wall of the core 18, and is directed toward the nearby end of the core 18. Likewise, along its forward margin, the cross wall 42 merges into another, although somewhat smaller, connecting tab 46 which lies against the forward wall of the core 18. It too is directed toward the nearby end of the core 18. The rear tab 44 has two rivets 48 extruded from it, whereas the front tab 46 has only a single rivet 48 extruded from it. These rivets 48 pass through apertures in the sheet metal core 18 and are upset over the outwardly presented face of the core 18 (FIG. 3), thereby firmly securing the end member 40 to core 18.

In addition to the two connecting tabs 44 and 46, each end member 40 has a bottom tab 50 (FIGS. 4, 8 & 9) which turns in the opposite direction, that is toward the post 2 at the center of the core 18. The bottom tab 50 is somewhat wider than the two connecting tabs 44 and 46 and spans the space between the lower margins of the arch-like core 18 where it is against the closure board 20, thus providing a backing for one end of that board. The bottom tab 50 contains an access hole 52 which is located close to the cross wall 42 and aligns with corresponding access holes in the closure board 20 and plastic trim cover 28.

Near the front connecting tab 46, the cross wall 42 has a relatively large aperture 56 of generally circular shape, and some of the sheet metal that originally occupied the aperture 56 is deformed inwardly toward the post 2 in the form of an arcuate seat 58 (FIGS. 7 & 9) which possesses the same diameter as the outer cylindrical surface of the split bushing 36. Indeed, the cylindrical portion of the split bushing 36 fits into the seat 58. More of the metal that originally occupied the aperture 56 is deformed inwardly toward the post 2 as a positioning tab 60 (FIGS. 7 & 9) which is located opposite to the seat 58 and is centered over the slit between the two lugs 38 on the bushing 36, thus overlying those lugs. The positioning tab 60 keeps the cylindrical portion of the bushing 36 against the seat 58, or in other words, the seat 58 and the tab 60, totally confine the bushing 36 in the radial direction. On each side of the tab 60, the cross wall 42 exists in its plane as stops 62 (FIGS. 3 & 9) against which the end face of the split bushing 36 bears, but the stops 62 do not extend inwardly past the inner surface of the bushing 36 where they might interfere with the trunnion 34. The stops 62 serve to prevent the bushing 36 from passing completely through the cross wall 42, or in other words, they locate the bushing 36 in the axial direction.

Between the rear connecting tab 44 and the circular aperture 56, the cross wall 44 has an even larger aperture 64 (FIGS. 7 & 9), this one being generally of rectangular configuration. The sheet metal which originally occupied the aperture 64 forms a clamp 66 which overlies the tab 60 and forces the two lugs 38 of the bushing 36 together. More specifically, the clamp 66 has a bight portion 68 which projects out over the tab 60 and parallel to it and in addition legs 70 which turn away from the bight portion 68 toward the seat 58 and the bushing 36 that is in it. The legs 70 at their ends are provided with inwardly directed lips 72 which bear against the exposed sides of the lugs 38 on the bushing 36. In other words, the two lugs 38 fit between the lips 72 of the clamp 66 (FIG. 7), and when those lips are urged together, the bushing 36 contracts around the trunnion 34, thus requiring a greater torque to move the cushion 4 between its inclined and upright positions.

The clamping force for urging the lips 72 of the clamp 66 together is derived from a machine screw 74 (FIG. 7) which passes loosely through the lower leg 70 and threads into the opposite or upper leg 70. The head of the screw 74 contains a conventional Philips cross slot and aligns with the access hole 52 in bottom tab 50 and the corresponding access holes in the closure board 20 and plastic trim cover 28. Thus, a screw driver may be inserted through the trim cover 28, closure board 20 and tab 50 to turn the screw 74. When the screw 74 is turned down against the legs 70 of the clamp 66, it draws the legs 70 together, and they in turn force their respective lips 72 against the lugs 38 on the bushing 36. This contracts the bushing 36, so that it offers greater resistance to rotation. The legs 70 and their respective lips 72, in effect, constitute clamping elements.

Actually the head of the machine screw 74 possesses a countersunk configuration and fits into a seat in the lower leg 70 of the clamp 66. However, the lower leg 70 and its seat are cocked slightly with respect to the upper leg 70, so that the seat in the former is slightly off-axis with respect to the threaded hole in the latter. Thus, when the screw 74 is tightened, the seat in the lower leg 70 approaches an on-axis position, and the lower leg becomes less cocked. In short, the seat in the lower leg 70 is moved into a condition of forced alignment with the axes of the screw 74. This stresses the clamp 66 and the screw 74 as well, and provides a spring-like retention force on the lugs 38 of the split bushing 36. The spring-like retention force accommodates wear at the bearing surface of the bushing 36 so that the legs 70 remain urged together after such wear. As a result the screw 74 does not work loose and the frictional resistance at the trunnions 34 remains about the same.

To assemble the head restraint A, the bracket 30 is fitted over the rivets 14 which protrude from the oblique upper portion 12 of the post 2, whereupon the rivets 14 are upset, thus securing the bracket 30 firmly to the post 2. Also, a split bushing 36 is fitted to the arcuate seat 58 of each end member 40 with the lugs 38 of that bushing being between the inwardly turned lips 72 on the clamp 66 for the end member 40. The screw 74 at this time is backed off somewhat, so the lugs 38 slide easily between the lips 72, and indeed the bushing 36 is advanced until its end face comes against the stops 62 of the end member 40. Enough friction exists between the bushing 36, on one hand, and the seat 58, the clamp lips 72 and the tab 60, on the other, to retain the bushing 36 in place, irrespective of the position of the end member 40. Next the end members 40 are placed in their operating positions on the bracket 30 by fitting the split bushings 36 of the former over the trunnions 34 on the latter. With the end members 40 in the same angular position at the ends of the bracket 30, the can or core 18 is placed over the end members 40. When the core 18 is properly located, the rivets 48 on the connecting tabs 44 and 46 of the end members 40 will project through apertures in the core 18, whereupon the rivets 48 are upset, thereby securing the end members 40 in the core 18. This prevents the end members 40 and bushings 36 from sliding axially off of the trunnions 34. Thereafter, the closure board 20 is fitted to the bottom of the core 18 and held in place with the cinch tabs that project from the latter.

After the end members 40 have been installed on the trunnions 34 of the bracket 30, and the core 18 has been secured to the end members 40, the clamps 66 may be adjusted to control the frictional resistance imposed by the split bushing 36. This is achieved by inserting the shank of a screw driver through the access holes in the trim cover 28 and closure board 20 and the access holes 52 in the bottom tabs 50 of the end members 40, which holes are aligned, and engaging the end of the screw driver with the heads of the machine screws 74 that are exposed through those holes. Each screw 74 is turned down to draw the two legs 70 of its clamp 66 together, and this causes the lips 72 on the clamp 66 to move against the lugs 38 of its bushing 36 and contract the bushing 36. As a consequence, the friction between the bushings 36 and trunnions 34 is increased, making the core 18 more difficult to pivot both forwardly and backwardly.

Finally, the padding 24 is placed over the core 18 and the cover 26 over the padding 24. The latter may be stapled or otherwise attached to the closure board 20. Thereafter, the plastic trim cover 28 is attached over the closure board and secured with self-tapping screws which thread into the bottom tabs 50 on the end members 40.

Of course, when the post 2 is installed in the socket of the backrest B for the seat, the cushion 4 is presented behind the head of the seat occupant. Here the cushion 4 is easily turned between its upright and inclined positions. In the upright position it is spaced from the normal position of the occupant's head, but will serve as a restraint to arrest movement of the head should the vehicle receive a sudden jolt forwardly. In this position the forward margins of the end members 40 bear against the front wall of the core 18, providing a stop which retards further movement (FIG. 6). In other words, any rearwardly directed force applied to the cushion 4, is transmitted directly from the core 18 to the bracket 30 and thence to the post 2 without passing through the bushing 36 and end members 40.

When the cushion 4 is moved to its inclined position, it is presented forwardly over the upper surface of the backrest B, and indeed is located where the seat occupant may rest his or her head against it without discomfort (FIG. 1). Thus, the cushion 4 serves as a head rest for reducing fatigue of the neck muscles during lon trips. If the inclined position presents the cushion 2 too far forwardly, the cushion 2 may be moved to an intermediate position which suits the occupant. The friction between the bushings 36 and the trunnions 34 will hold the cushion 2 in the intermediate position that is selected.

The resistance to rotation may be altered merely by turning the machine screws 74, and this may be accomplished while the head restraint A is on the backrest B. Indeed, to alter the frictional resistance, it is merely necessary to insert the shank of a conventional screw driver through the access holes in the plastic trim 28 and closure board 20 and the access holes 52 in the bottom tabs 50 of the end members 40 to engage the heads of the machine screws 74 which are thereupon turned.

This invention is intended to cover all changes and modifications of the example of the invention herein chosen for purposes of the disclosure which do not constitute departures from the spirit and scope of the invention.

What is claimed is:

1. A head restraint for use on the backrest of a seat for an automotive vehicle, said head restraint comprising: a generally upright post; a cushion supported on the post; and pivot means located between the post and the cushion for connecting the cushion with the post such that the cushion can pivot on the post about a generally horizontal axis of rotation, the pivot means including a first member attached firmly to the post, a second member in the cushion, and a split bushing located generally between the first and second members, one of the members having a spindle attached rigidly to and projecting from that member concentric to the axis of rotation such that it does not rotate relative to the post, the split bushing being around the spindle and having a pair of lugs which are separated at the split in the bushing such that the bushing will contract slightly when the lugs are urged together, the other member having a seat and a clamp which together receive the bushing and prevent the other member from moving radially or turning with respect to the bushing, the clamp being located externally of both the bushing and its rugs and having clamping elements between which the lugs of the bushing fit with the clamping elements being against the lugs, the clamp also having a screw located remote from the lugs on the bushing for urging the clamping elements together when the screw is turned in the correct direction, whereby the bushing contracts to increase the frictional resistance between the bushing and spindle so that a greater torque is required to change the angular position of the cushion on the post.

2. A head restraint according to claim 1 wherein the split bushing is generally cylindrical, but has the lugs projecting generally radially from its; and wherein the seat in said other member is concave and is presented toward the clamp.

3. A head restraint according to claim 2 wherein said other member is further configured to prevent the bushing from moving axially off of the seat away from said one member.

4. A head restraint according to claim 1 wherein the screw has a head which is presented toward the underside of the cushion and is accessible from the underside of the cushion.

5. A head restraint according to claim 1 wherein the cushion includes a rigid core and padding carried by the core; and wherein said other member of the pivot means is the second member and the second member rigidifies the core.

6. A head restraint according to claim 5 wherein the second member is one of two second members, there being one at each end of the cushion, and the split bushing is one of two split bushings, there being one carried by each second member.

7. A head restraint for the backrest of a seat for an automotive vehicle, said head restraint comprising: a generally upright post; a pair of spindles mounted on the post along a generally horizontal axis that is fixed in position with respect to the post; a split bushing around each spindle, each bushing being generally cylindrical in configuration, but having two generally radial lugs which are spaced slightly apart to form the split in the bushing; an end member at each bushing, each end member having a seat and a clamp, with the seat being presetned toward the clamp, the seat being along the cylindrical portion of the bushing and the clamp being at the lugs, with the configuration and positioning of the seat and clamp being such that they cooperate with the bushing to prevent the end member from both moving radially and rotatively with respect to the bushing, the clamp having clamping elements located against the lugs of the bushing such that the lugs are between the clamping elements, the clamp further having a screw extending through the clamping elements remote from the lugs for moving the clamping elements together when turned in the proper direction, whereby the torque required to rotate the end member relative to its spindle and to the post may be varied; a core extended between and attached firmly to the end members; and padding over the core.

8. A head restraint according to claim 7 wherein the post, the spindles, the end members, and the core are formed from metal, and the bushing is formed from a polymer.

9. A head restraint according to claim 7 and further comprising a bracket attached firmly to the post projecting laterally from the post; and wherein the spindles are mounted rigidly on and project from the bracket.

10. A head restraint for use on the backrest of a seat for an automotive vehicle, said head restraint comprising: a generally upright post; spindles mounted in fixed positions with respect to the post and being along a generally horizontal axis; a split bushing located around each spindle and having radially directed lugs, with the split in the bushing being between the lugs; an end member at each bushing, with each end member being configured to receive the bushing at which it is located such that the member moves neither radially nor rotatively on the bushing; clamping means mounted on each end member externally of the bushing on that member for contracting the bushing so as to maintain frictional resistance between the bushing and the spindle around which it fits, whereby torque is required to pivot each end member relative to the spindle at which it is located, the clamping means for each end member including clamping elements between which the lugs of the bushing for that end member fit and means located externally from the bushing and its lugs for holding the lugs in a fixed position with respect to each other so as to maintain the frictional resistance between the bushing and its spindle, a generally rigid core extended between and attached firmly to the end members; and padding over the core, whereby the core, end members and padding will pivot as a unit relative to the post.

11. A head restraint according to claim 10 wherein the core has an opening through which access to the means for contracting the bushing is available.

12. A head restraint according to claim 10 wherein the clamping means for contracting the bushing includes a clamp having clamping elements located to the sides of the lugs and a headed screw extended through the clamping elements for urging them together.

13. A head restraint according to claim 12 wherein the clamp further includes a bight portion extended over the lugs of the bushing; and wherein the clamping elements are attached to the bight portion.

14. A head restraint according to claim 13 wherein one of the clamping elements has a threaded hole into which the screw threads and the other has a seat into which the head of the screw fits, the seat being slightly off-axis with respect to the threaded hole so that when the screw is tightened down, both it and the clamp are stressed to exert aspring-like retention force on the lugs of the bushing.

15. A head restraint according to claim 13 wherein end members rigidify the core, and the clamps are formed integral with the end members.

16. A head restraint according to claim 13 wherein each end member has an arcuate seat located opposite to its clamp with the seat conforming in configuration to and receiving the cylindrical part of the bushing for that end member.

17. A head restraint according to claim 16 wherein each end member also has stops located opposite the end face for the bushing of that end member so as to prevent the bushing from passing through the end member.

* * * * *

UNITED STATES PATENT AND TRADEMARK OFFICE
CERTIFICATE OF CORRECTION

PATENT NO. : 4,682,817
DATED : July 28, 1987
INVENTOR(S) : Elmer C. Freber

It is certified that error appears in the above-identified patent and that said Letters Patent is hereby corrected as shown below:

Under the heading "ABSTRACT", in line 13, "is" should be "it".

Column 2, line 22, "embodying" should be inserted after "and".

Column 3, line 54, "cor" should be "core".

Column 7, line 30, "lon" should be "long".

Column 8, line 5, "rugs" should be "lugs".

Column 8, line 17, "its;" should be "it;".

Column 8, line 49, "presetned" should be "presented".

Signed and Sealed this

Eighth Day of December, 1987

*Attest:*

DONALD J. QUIGG

*Attesting Officer*   *Commissioner of Patents and Trademarks*